(12) United States Patent
Charugundla

(10) Patent No.: US 9,648,160 B2
(45) Date of Patent: May 9, 2017

(54) COMMUNICATION SYSTEM HAVING USER SELECTABLE FEATURES

(71) Applicant: Kent S. Charugundla, New York, NY (US)

(72) Inventor: Kent S. Charugundla, New York, NY (US)

(73) Assignee: C21 Patents, LLC, New York, NY (US)

( * ) Notice: Subject to any disclaimer, the term of this patent is extended or adjusted under 35 U.S.C. 154(b) by 503 days.

(21) Appl. No.: 13/904,854

(22) Filed: May 29, 2013

(65) Prior Publication Data

US 2014/0359138 A1  Dec. 4, 2014

(51) Int. Cl.
*H04L 29/08* (2006.01)
*H04M 3/42* (2006.01)

(52) U.S. Cl.
CPC .... *H04M 3/42153* (2013.01); *H04M 3/42391* (2013.01); *H04M 2201/40* (2013.01); *H04M 2203/30* (2013.01)

(58) Field of Classification Search
CPC .... H04M 3/56; H04M 7/0036; H04M 1/6505; G06F 9/4443; G06F 17/3089; G06F 9/465; G06F 9/541

USPC .......................................................... 709/227
See application file for complete search history.

(56) References Cited

U.S. PATENT DOCUMENTS

| | | | |
|---|---|---|---|
| 2013/0304457 A1* | 11/2013 | Kang | G10L 13/00 704/201 |
| 2014/0114963 A1* | 4/2014 | Jurascheck | G06F 17/30 707/723 |

* cited by examiner

*Primary Examiner* — Tu Nguyen
(74) *Attorney, Agent, or Firm* — Paul J. Sutton; Barry G. Magidoff

(57) ABSTRACT

A communication system comprising a server capable of establishing telephone communications between at least two users of a communication network and transcribe audio and/or voice communication signals of either or both users of a telephone call established by the server and the transcription is done in accordance with user selectable feature information entered by the users during a registration procedure to the communication system at a website residing in a registration server in communication with the communication system. The communication system may be part of the PSTN or the Internet or both.

12 Claims, 2 Drawing Sheets

COMMUNICATION SYSTEM HAVING USER SELECTABLE FEATURES

FIELD OF THE INVENTION

The present invention generally relates to the field of telecommunications. In particular, the present invention relates to a communication system that allows its users to select their desired features.

BACKGROUND OF THE INVENTION

The types of personal communication devices used in various available communication networks have increased in the past several years. Users of personal communication devices have available to them such devices as cellular phones (many of which are of the smartphone variety), tablets, laptops, wireline phones and other devices. Users who are hearing impaired and/or who suffer from some type of speech impediment, for the most part, cannot use a typical personal telecommunication device to any effective extent without having to undergo a lengthy process of registering for subscription to additional features provided by the service provider to whom they currently subscribe. Many times, such subscribers are provided with special equipment and need to go through certain arrangements in order to receive the desired services from their service providers. For example, for a telephone call, a user may have to dial a special number prior to making a telephone call; the special number allows the user's communication device to communicate directly with an agent or customer service personnel of the service provider to allow for the allocation of special equipment and other resources in establishing and/or maintaining the telephone call. In many circumstances, each time a user wants to change or add features, the user has to go though the registration process, usually with a customer service personnel of the service provider, to effectuate the special features.

One of the features on which hearing impaired users rely is the transcribing of incoming voice that allows these users to receive captioned text representing the words being spoken by another party during an established telephone call between the user and the other party. Another feature may be where the equipment may have text transmission capabilities whereby the subscriber types his/her responses during the conversation because the subscriber may have a speech impediment in addition to being deaf or hearing impaired. Further, because of a speech impediment of a subscriber, or a user wanting to become a subscriber, a conversation between a customer agent and a user may be virtually impossible, or at the very least, extremely difficult.

With the state of communication devices today, a user with a speech impediment will have great difficulty in conveying his/her request for special services being provided by a service provider. Further, such a user may have special requests for services not advertised by the service provider, but may be well within the set of services such a provider could provide. Without having the ability to properly convey their desired features for communication services to a service provider or an agent thereof, users who are hearing impaired and/or users who have a speech impediment may not be able to take advantage of some of the communication services designed especially for them. Ironically, this problem fundamentally stems from a lack of communication capability between the user and an agent of the service provider.

BRIEF SUMMARY OF THE INVENTION

The method and system of the present invention provide a communication system server capable of providing communication services including transcription services to its users based on at least received user information such as user selected feature information entered by users and received by a user accessible communication portal of the communication system server. Users are able to select from a list of available features, including transcription services, provided by the service provider. Users are also able to enter user profile information at the user accessible communication portal during a registration process wherein they are able to become subscribers of the service provider and thus subscribe to and enter into a payment agreement with the service provider for desired services.

In one embodiment, the system of the present invention comprises a communication switch, a registration server, a transcription engine and a user database all of which are coupled to each other directly or indirectly as described herein. The communication switch is also coupled to one or more communication networks and to user equipment via the one or more communication networks. The registration server has a user accessible portal that provides users and/or subscribers the ability to select specific features from a list of available features provided by the system provider. The user accessible communication portal may be implemented, for example, as one or more Internet websites residing in the registration server (or coupled to the registration server) at which users can subscribe for communication services in a registration process during which users can select from a list of available features that are part of the services for which they are registering. During the registration process, a user can also provide user authentication information to the registration server. The system can then use the user authentication information to later confirm that a user requesting additional services, including new features or a change of features, can be confirmed as a registered subscriber who has already entered into an agreement with the service provider to pay for specific communication services. The user authentication information is typically information that is unique to each particular user; for example, user created login and password may be used as authentication information.

The method of the present invention comprises establishing, by the communication switch, communications (e.g., a telephone call) between at least two users at least one of which has requested communication services. The users can select the features they desire from a list of features through a user accessible communication portal. The users also have the ability to describe other features (not listed by the service provider), and request for such features they believe can be provided by the service provider. One of the listed features can be the capability of transcribing voice and or audio communication signals into associated text. The associated text can then be transmitted as per user settings established during the registration process wherein users select and, in some cases, describe the particular type of services and associated features they are seeking.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

DETAILED DESCRIPTION

Figure 1:
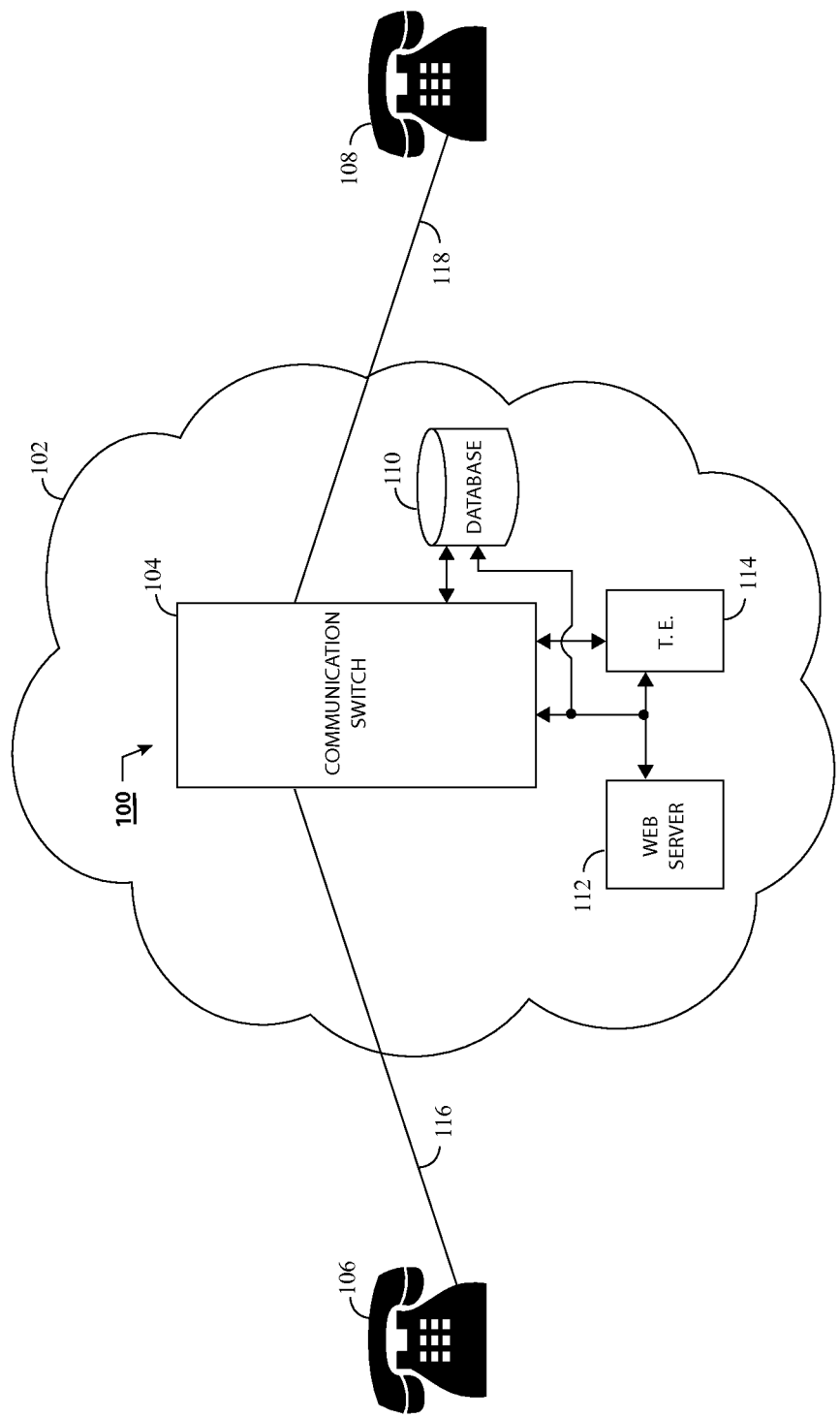
FIG. 1 is a block diagram of one embodiment of the communication system of the present invention.

The method and system of the present invention provide a communication system server capable of providing communication services including transcription services to its users based on at least received user information such as user selected feature information entered by users and received by a user accessible communication portal of the communication system server. Users are able to select from a list of available features, including transcription services, provided by the service provider. Users are also able to enter user profile information at the user accessible communication portal during a registration process wherein they are able to become subscribers of the service provider and thus subscribe to and enter into a payment agreement with the service provider for desired services.

In one embodiment, the system of the present invention comprises a communication switch, a registration server, a transcription engine and a user database all of which are coupled to each other directly or indirectly as described herein. The communication switch is also coupled to one or more communication networks and to user equipment via the one or more communication networks. The registration server has a user accessible communication portal that provides users and/or subscribers the ability to select specific features from a list of available features provided by the system provider. The user accessible communication portal may be implemented, for example, as one or more Internet websites residing in the registration server (or coupled to the registration server) at which users can subscribe for communication services in a registration process during which users can select from a list of available features that are part of the services for which they are registering. The websites for the registrar server may reside at another server but may be directed to or coupled to the registration server. During the registration process, a user can also provide user authentication information to the registration server. The system can then use the user authentication information to later confirm that a user requesting additional services, including new features or a change of features, can be confirmed as a registered subscriber who has already entered into an agreement with the service provider to pay for specific communication services. The user authentication information is typically information that is unique to each particular user; for example, user created login and password may be used as authentication information.

The method of the present invention comprises establishing, by the communication switch, communications (e.g., a telephone call) between at least two users at least one of which has requested communication services. The users can select the features they desire from a list of features through a user accessible communication portal The users also have the ability to describe other features (not listed by the service provider), and request for such features they believe can be provided by the service provider. One of the listed features can be the capability of transcribing voice and or audio communication signals into associated text. The associated text can then be transmitted as per user settings established during the registration process wherein users select and, in some cases, describe the particular type of services and associated features they are seeking. Any subscriber can request for the transcription of his own voice communications, or for transcription of someone the subscriber has called or both the subscriber and the called party. There may be many variations to such requests. For example, a request can be valid for a certain period of time defined by the subscriber. The request can be defined in terms of a particular number of communication sessions (e.g., received telephone calls, received conference calls) in which the subscriber has participated. The request can be a certain number of telephone calls made by the subscriber over a communication network such as the Internet. The request can be associated with the number of telephone calls made to a particular other party (i.e., another user or other subscriber) or can be specific to one particular party or group of parties.

The method and system of the present invention provide a communication system server capable of providing communication services including transcription services to its users based on at least received user information such as user selected feature information entered by users and received by a user accessible communication portal of the communication system server. Users are able to select from a list of available features, including transcription services, provided by the service provider. Users are also able to enter user profile information at the user accessible communication portal during a registration process wherein they are able to become subscribers of the service provider and thus subscribe to and enter into a payment agreement with the service provider for desired services.

In one embodiment, the system of the present invention comprises a communication switch, a registration server, a transcription engine and a user database all of which are coupled to each other directly or indirectly as described herein. The communication switch is also coupled to one or more communication networks and to user equipment via the one or more communication networks. The registration server has a user accessible portal that provides users and/or subscribers the ability to select specific features from a list of available features provided by the system provider. The user accessible communication portal may be implemented, for example, as one or more Internet websites residing in the registration server at which users can subscribe for communication services in a registration process during which users can select from a list of available features that are part of the services for which they are registering. During the registration process, a user can also provide user authentication information to the registration server. The system can then use the user authentication information to later confirm that a user requesting additional services, including new features or a change of features, can be confirmed as a registered subscriber who has already entered into an agreement with the service provider to pay for specific communication services. The user authentication information is typically information that is unique to each particular user; for example, user created login and password may be used as authentication information.

The method of the present invention comprises establishing, by the communication switch, communications (e.g., a telephone call) between at least two users at least one of which has requested communication services. The users can select the features they desire from a list of features through a user accessible communication portal The users also have the ability to describe other features (not listed by the service provider), and request for such features they believe can be provided by the service provider. One of the listed features can be the capability of transcribing voice and or audio communication signals into associated text. The associated text can then be transmitted as per user settings established during the registration process wherein users select and, in some cases, describe the particular type of services and associated features they are seeking.

The description of the communication subsystem and the method of selecting features of the present invention is disclosed herein using the following terms, terminology, definitions and abbreviations:

The associated text refers to readable text resulting from a voice recognition system (using voice recognition software and speech tuning algorithms) that analyzes and processes acoustics generated from voice signals. Alternatively, electrical signals representing voice signals can also be processed by such a voice recognition system to transcribe automatically electric signals representing words spoken by a person or words generated by a speaker or other voice-broadcasting device.

A Server is a computer or computer system comprising of one or more processors, various blocks of memory, and supporting circuitry to process information and to interface with users or other servers.

A registration server is a server that may be publicly available through one or more publicly accessible communication network(s) to allow users and/or subscribers to enter various types of information including but not limited to user selected feature information and user profile information.

The term "automatic" or "automatically" refers to a process of steps and/or act(s) or tasks performed by electrical, electronic or electromechanical devices, mechanical devices, machine or systems (including the present invention) in response to information or signals inputted and/or received into such machines, devices or systems.

A communication network is any digital or analog network or any combination of such networks whereby transmission and reception of associated text, voice, video, and graphics can be achieved.

Telephone call or communications—a communication link established between at least two parties each having a communication equipment (e.g., cell phone, telephone, desktop or laptop computer, tablet) allowing each of the equipment to transmit and/or receive voice, text, video, graphics and various other forms of information through operation of said equipment by an entity (e.g., one or more persons, communication equipment) where the information is transmitted over one or more communication networks in accordance with the standards and protocol of such networks.

Party—communication equipment used to transmit and receive signals (e.g., voice, video, text, graphic) over one or more communication networks. Also, a person, machine/device or system operating said communication equipment and using resources being provided by a service provider (e.g., an Internet Service Provider (ISP)) to effectuate a telephone call or communications over one or more communication networks.

Established telephone call or Established communications refers to the provision of various communication infrastructure equipment, communication channels, communication links and other resources owned and/or controlled (at least during a telephone call or during communications) by a service provider to effectuate communications between the parties to a telephone call as per the standards and protocols of the one or more networks through which the signals of the telephone call traverse.

Registered User refers to a user who has undergone a registration process established by a service provider. The registration process is preferably performed through a user accessible communication network portal (e.g., a website on the Internet; toll free number over a telephone network such as the Public Switched Telephone Network or PSTN) wherein the service provider has established a procedure through which a user can input user profile information, user authentication information and can select one or more desired features from the list of available user selectable features provided by the service provider. Also, during the registration process, the user is able to describe and request service for any other feature not on the list of available user selectable features during registration. Hereinafter, the terms "registered user," "registered party," or "subscriber" can be used interchangeably.

The term "couple" or "couple(d) to" as used herein refers to a path or a series of connected paths (permanent or temporary) that allows information (in one or more formats) or signals to flow from one point or equipment in a communication network to another point within the same equipment or another equipment in the same or different communication network in accordance with the protocol(s) of the communication network(s).

The term user(s) refers to individuals, groups of individuals, an organized entity such as a corportation, or a communications system or a subsystem thereof with the ability to enter user profile information, user selectable feature information or other information at a user and/or publicly available service provider communication portal. The information inputted by the user(s) dictates how voice, data, graphics, video information and other information is to be processed during an established telephone call between at least two users. Users who have successfully registered and have a login and password associated with them are referred to as subscribers.

The term user profile information relates to identification information and relevant personal information of a user. The inputting of user profile information can be done, for example, at a service provider designated website, a toll free 800 number or through other publicly accessible communication portals.

The term Internet enabled device(s) relates to various personal communication equipment owned and/or used by users to convey information over the Internet. Examples of such equipment are laptops, telephones, cellular phones (e.g., smartphones), tablets, desktop computers and other communication devices capable of gaining access to the Internet through the use of Internet browsers such as Explorer, Safari, Firefox, Windows Mobile, Netscape Navigator, Lynx, Symbian and receive information on only in their original formats, but also in Java, Flash, HTTP/S, TEXT and XML format, which are typically used by the Internet.

The term user authentication information refers to information inputted by a user during the registration process that uniquely identifies the user and which allows a service provider to confirm the identity of the user and the particular set of services for which the user has registered. User login and password for a website are examples of user authentication information.

The term user selectable feature information refers to information that describes a defined set of processing steps of signals or a set of operations applied to user received communication signals by communication equipment owned and/or controlled by a service provider where said steps or operations are performed to achieve a predictable and/or desirable outcome by a user and/or by a service provider.

The term user database information refers to information formatted as per a communication standard and/or protocol that uniquely identifies user equipment (including Internet enabled devices) such as an IP phone. For example, user database information for an IP phone would be the phone number associated with the phone or the particular telephone line to which the IP phone is connected.

The term service provider refers to an entity or organization that owns and/or controls various communication equipment forming a communication system where said communication equipment provides communication services to subscribers in one or more communication network(s) in accordance with the standards and protocols of the communication network(s).

The term communication service(s) refers to specific sets of processing steps or processing procedures applied to received user generated communication signals performed by equipment owned and/or controlled by a service provider in accordance with protocols and communication standards of the one or more communication networks to which the service provider equipment is coupled.

The term user accessible communication portal refers to a user accessible communication access point to which users convey (i.e., transmit and/or receive) information regarding the type of service they desire or adjustments to the type of service for which they have registered. The communication portal can be part of a communication network such as the PSTN or the Internet or both. The communication portal is implemented as an Internet website residing on the registration server or an 800 toll free number or other toll free number manned by agents of the service provider or equipped with automatic answering software that can assist a user in selecting the type of service including user selectable features that can be selected.

Referring now to FIG. 1, there is shown the communication system 100 of the present invention positioned as part of a communication network 102 and coupled to user equipment 106 and 108 via communication channels 116 and 118 respectively. Communication network 102 can be the Internet, the PSTN (Public Switched Telephone Network) or any analog or digital network through which audio/voice signals, text, graphics, video and other types of signals can traverse in accordance with communication standards and protocols of the communication systems. Further, communication network 102 may represent more than one network. For example, portions of the communication system of the present invention may be part of the Internet while other portions may be part of the PSTN or POTS (Plain Old Telephone System).

The communication system 100 of the present invention comprises communication switch 104, Database 110, registration server 112 and Transcription Engine 114. The communication channels 116, 108 that couple user equipment 106 and 118 to communication switch 104 may be part of a communication network of which the communication switch 104 forms part. For example, the communication channels 116, 118, communication switch 104, Transcription Engine 114 and may be part of the PSTN while registration server 112 may be part of the Internet thus making registration server 112 a web server. User equipment 106 and 108 may be IP (Internet Protocol) phones capable of transmitting and/or receiving voice and/or text over the Internet in accordance with VoIP protocols and standards. Communication channels 116 and 118 may be voice/data channels that are equipped to carry text, voice, audio, video, graphics, any combination thereof and other types of signals. The various components of communication system 100, viz., communication switch 104, registration server 112, Transcription Engine 114 and database 110 are coupled to each other either directly or indirectly. For example, although there is no direct coupling between Transcription Engine 114 and database 110, it will be readily understood that information (i.e., in the form of communication signals) can be conveyed (i.e., transmitted and/or received) between each such component via the communication switch 104.

Transcription Engine 114 may be implemented as a computer system having at least one processor for executing voice recognition software and/or speech tuning algorithms to transcribe voice and/or audio communication signals, automatically and in real time, into associated text based on at least user selected feature information. Database 110 may be implemented as a memory space containing information associated with users of a communication network to which the switch is coupled and said information relates to identity of user or user equipment as defined by communication standards and protocols of one or more communication networks to which the communication switch is coupled. For example, one type of user database information may be the telephone number associated with a particular telephone line to which user equipment of a user is connected. For example, when a user originates a call, the telephone number associated with the line connected to the user equipment (e.g., IP phone) is the user information for that IP phone that is stored in the user database. A registration server is a server that receives user profile information, user authentication information. A user desiring to be a subscriber to the communication system of the present invention will use a user accessible communication portal through which he/she enters user profile information, user authentication information and other types of information. The user accessible communication portal may also be publicly accessible. All of the entered information is stored in the registration server. Communication switch 104 represents switching equipment ultimately coupled to user equipment via intermediate connections (not shown) and/or communication channels and also coupled to other communication equipment such as other communication switches via high capacity communication channels (e.g., trunk lines). Communication switch 104 has the capability to establish communications (e.g., a telephone call) with one or more user equipment simultaneously in accordance with communication standards and protocols of the communication network to which the communication switch belongs.

The communication system 100 and method of the present invention provide users with the capability to specify the type of service they desire through a selection of user selectable features that are listed and accessible to a user during a registration process. Further, a registered user (i.e., a subscriber) may subsequently amend its set of user selectable features at any point. Also, a user or subscriber may specify the length of period during which each or any of its user selected features is activated. For ease of explanation, the following description of the operation of the communication system and method of the present invention will be made in the context of communication switch 104, database 110, Transcription engine 114 being part of the PSTN and registration server 112 being part of the Internet. It will be understood that all of the components of communication system 100 as shown in FIG. 1 may be implemented as a single server having digital and analog communication equipment, processors, logic and memory circuitry to perform all of the tasks needed to allow a user to select the services and associated features being provided by communication system 100. The communication system 100 is shown with separate components for ease of explanation and thus it will be understood that the communication system of the present invention is not limited in any manner by the specific implementation shown in FIG. 1. Other implementations can be configured or designed to fall within the province of the present invention as described and claimed herein.

A user wishing to subscribe to the communication services being provided by communication system 100 will first register via the Internet at a website residing in Web server 112 shown in FIG. 1. The user will provide user profile information such as name, address, telephone number, email address, and payment information such as credit card information. The user will also provide user authentication information, which is information that is unique to the user to allow the system to confirm a user's identity in subsequent user request to gain access to the website. Thus, the website serves as a user accessible communication portal. Another implementation of a user accessible communication portal is an 800 toll free number where the user can select various available features when prompted by a system to press a certain number indicating selection of a particular feature. Alternatively, a user who does not have any speech impediment can discuss, via telephone, his/her desired features with an agent of a service provider who owns and/or controls the communication system of the present invention. Upon dialing the 800 toll free number, the user will be give the choice to either communicate via the prompting system or with an agent of the service provider. When registering through a website, a user will be given an opportunity to describe any other features he/she desires, but which is not included in the list of user selectable features presented to the user by the website. In such a scenario, a user can have a follow up discussion with an agent of the system by phone or via text through a chat function provided by the service provider. A user accessible communication portal may be publicly accessible or may have limited access.

One of the features that a user, who is hearing impaired or deaf, can select is to be able to receive a transcription of the voice signals being transmitted to that user's equipment (e.g., an IP phone) during a telephone call originated either by the user or by the other party to the telephone call. Further, a user may desire to have a transcript of his own voice in addition to a transcript of the other party for a telephone conversation. The user may choose to transcribe telephone calls for a certain period of time or for certain incoming calls or for certain telephone numbers called by the user. A user is able to amend the settings for transcription of telephone calls at any time during his/her subscription.

For example, after a user of IP phone 106 has registered and thus has subscribed to a service and has also selected the feature of real time automatic transcription of received and transmitted voice and/or audio signals during an established telephone call (originated and/or received by the user), the user selectable feature information is conveyed from Web server 112 to communication switch 104, Transcription Engine 114 and Database 110; this information will indicate to these equipment that the communication system 100 is to generate a transcript of voice and/or audio signals transmitted and/or received by IP phone 106 during and established telephone call originated or received by IP phone 106. Database 110 contains user database information that identifies user equipment in a manner defined by the PSTN (or the network that communication switch 104 is part of). For example, when communication switch 104 is part of the PSTN each user equipment (e.g., each IP phone) is identified by a telephone number with a specific format defined by the pertinent PSTN protocols. Thus a telephone call involving IP phone 106 will be established by communication switch 104 so as to execute the transcription feature that was requested by the user of IP phone 106 during his/her registration process or procedure. Communication switch 104, although shown coupled to IP phones 106 and 108, is also coupled to a plurality of user equipment and to other communication equipment such as other switches (not shown). For ease of discussion only IP phones 106 and 108 are shown coupled to communication switch 104.

Continuing with the above example, suppose the user of IP phone 106 originates a call to IP phone 108. Communication switch 104 proceeds to establish the call and connects the phones via their respective communication channels (116 and 118) as shown. Prior to completing the establishment of the call, communication switch 104 will determine if the called user (i.e., user of IP phone 108) is a subscriber and further whether such a subscriber already has selected transcription of transmitted and/or received voice and/or audio signals. If the user of IP phone 108 is a subscriber and has already selected the transcription of transmitted and received audio/voice signals, then communication switch 104 completes the establishment of the call. Voice and/or audio signals from user of IP phone 106 are received by communication switch 104 via communication channel 116. Communication switch 104 routes the signals from IP phone 106 to Transcription Engine 114, which transcribes said signals into associated text. Transcription Engine 114 then transfers the associated text to communication switch 104, which transmits the associated text to user equipment 106 and 108. Similarly, voice and/or audio signals from IP phone 108 are transcribed into text and transmitted to IP phones 106 and 108.

Still continuing with the example being discussed, but suppose that the user being called (i.e., user of IP phone 108) is either (i) a subscriber, but has not selected the transcription feature; (ii) is a subscriber but has selected to transcribe his own voice to himself and not to anyone else; or (iii) is not a subscriber. In this case, during the establishment of the telephone call, communication switch 104 will retrieve a message (which can be stored in database 110) informing the user of IP phone 108 that the caller wishes to transcribe the voice signals from IP phone 108. The message will further inform the user of IP phone 108 that he/she can continue with the telephone call or terminate the call. If the user of IP phone 108 decides to terminate the call upon giving the option to do so, communication switch 104 will do so and send a message to the user of IP phone 106 that the call was terminated by the called party and that the user of IP phone 106 could consider removing the transcription feature and try calling again. The user of IP phone 106 can then make the changes to the user selectable feature information and make the call to IP phone 108 again. In this manner any user having its equipment that is routed through communication switch 104 of the present invention who does not want their voice/audio signal transcribed will be given the opportunity not to proceed with such communications during establishment of such communications by communication switch 104 of the communication system of the present invention.

Figure 2:
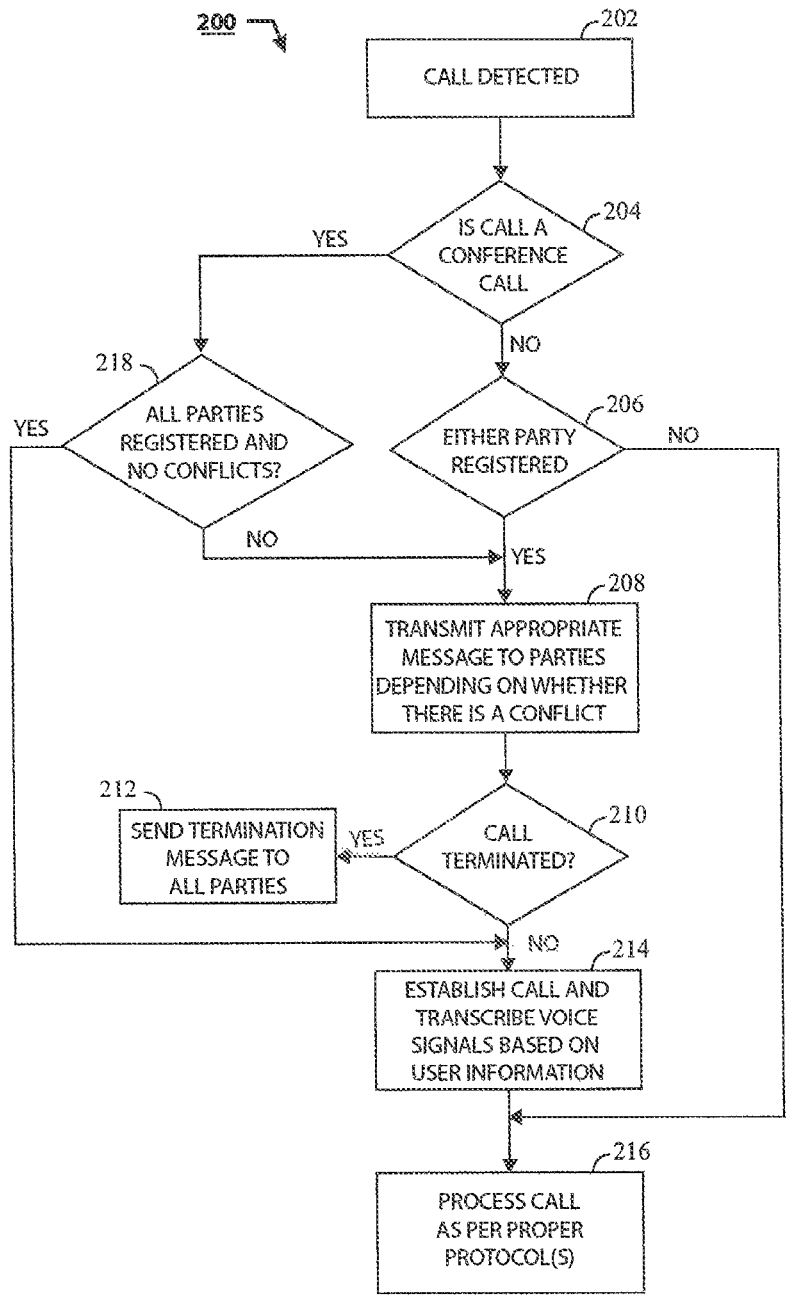
FIG. 2 is a flow chart of one embodiment of the method of the present invention.

Referring now to FIG. 2, there is shown a flow chart 200 representing the method of the present invention. For ease of discussion, the method of the present invention will be explained in the context of the embodiment of the communication system of the present invention as shown in FIG. 1. Further, the communications to be established by communication switch 104 is a telephone call. In step 202 a telephone call is detected by communication switch 104. In step 204, the communication switch 204 determines whether the telephone call is a conference call.

If the telephone call is indeed a conference call, the method of the present invention moves to step 218 where the communication switch 104 determines, from information in the web server 112 and database 110, whether any of the parties to the conference call is registered as a subscriber to the communication system. If all of the parties are registered users or subscribers, and there exists no conflict situation, then the method of the present invention moves to step 214.

A conflict situation exists when the setting for text transmission and reception by any one party is in direct conflict with the setting of another party to the conference call. For example, suppose party A wants to receive text of his own voice and not have this text transmitted to anyone else. Further, suppose party B wants to receive text of party of everyone's voice including party A's voice then we have a conflict situation.

In such a situation, the method of the present invention moves to step 208 where, for a conference call, it sends the appropriate messages to all parties indicating the conflicts and suggesting one or more default situations to remove the conflicts. The method of the present invention then moves to step 210 where the call is terminated and messages are sent to all parties informing them of the conflicts and their need to resolve these conflicts before making another call between them. Also, for a conference call, if some of the parties are registered (i.e., not all of the parties are registered), the method of the present invention moves to step 208 if there is a conflict and proceeds as discussed above. If there is no conflict, the method of the present invention moves to step 214.

In step 214, there is no conflict in the conference call and thus the communication system establishes the call to transcribe the various voice signals as per the settings of the user selectable information of the parties. The method of the present invention them moves to step 216 where the conference call is processed as per the protocol(s) of the communication network within which the communication switch resides.

Returning to step 204, if the call is not a conference call (i.e., the call involves only two parties), then the method of the present invention moves to step 206 where the method of the present invention determines whether either party is registered. If none of the parties is registered or is a subscriber, then the method of the present invention moves to step 216 and processes the call in accordance with the proper protocols. It is to be noted that in the case where none of the parties is registered for a two party call (or for a conference call), the parties may still use the communication system of the present invention, but may not enjoy the features (such as voice transcription). Such features are only available for those who have subscribed to them.

Returning to step 206, if one or both of the parties are registered, the method of the present invention moves to step 208. In step 208 either both parties are registered or one of the parties is registered. If there is a conflict situation whereby one of the parties has set a limitation on the transmission of his text (i.e., his/her voice transcribed) then the method of the present invention will terminate the call in step 210. In step 212, the method of the present invention will send a message to both parties explaining to each party why the call was terminated and suggest that both parties amend their settings to remove the conflict if they want to communicate with each other over the communication system. A conflict may exist, for example, when a first party wants to receive the text of a second party, but the second party only wants to transmit his text to himself and not to the first party.

If, however, there is no conflict situation, then a confirmation message is sent to both parties in step 208. The confirmation message confirms to both parties how their transcribed text will be transmitted if at all. The call is not terminated in step 210 and the method of the present invention moves to step 214 where the call is established as per the user selectable feature information and then to step 216 where the call is processed as per the pertinent and proper protocols of the communication network(s) being used by the parties and the communication switch.

While various aspects of the present invention have been described above, it should be understood that they have been presented by way of example and not limitation. It will be apparent to persons skilled in the relevant art(s) that various changes in form and detail can be made therein without departing from the spirit and scope of the present invention. Thus, the present invention should not be limited by any of the above described exemplary aspects, but should be defined only in accordance with the following claims and their equivalents.

In addition, it should be understood that the figures in the attachments, which highlight the structure, methodology, functionality and advantages of the present invention, are presented for example purposes only. The present invention is sufficiently flexible and configurable, such that it may be implemented in ways other than that shown in the accompanying figures.

What is claimed is:

1. A communication system comprising:

A server forming part of at least one communication network and configured to receive user settings for at least user selected feature information where the server uses the received user settings to establish communications between said users when no conflict exists between the received user settings, and when at least one conflict exists between the received user settings, the server is further configured to send a message to users of the established communications informing the users of the at least one conflict and suggesting one or more default situations to remove the at least one conflict and wherein the server comprises a communication switch, a registration server, a transcription engine and a user database coupled to each other within and/or through the at least one communication network and where the registration server has a user accessible communication portal to allow the server to process communication signals of the established communications based on at least the user selected feature information received from the user accessible communication portal.

2. The system of claim 1 where the transcription engine comprises a computer system having at least one processor for executing voice recognition software and/or speech tuning algorithms to transcribe voice and/or audio communication signals, automatically and in real time, into associated text based on at least user selected feature information.

3. The communication system of claim 1 where the communication switch establishes the communications in accordance with protocols and/or communication standards of the one or more communication networks to which the communication switch is coupled.

4. The communication system of claim 1 where the user accessible communication portal is a toll free number accessible via the PSTN (Public Switched Telephone Network) or the Internet.

5. The communication system of claim 1 where each user first registers for service via the user accessible communication portal and enters user profile information into the registration server and where the communication switch routes receive communication signals of the established communications in accordance with the received user selectable feature information from at least one of the users.

6. The communication system of claim 5 where the user database contains information associated with users of a communication network to which the switch is coupled and said information relates to identity of a user or user equipment as defined by communication standards and protocols of one or more communication networks to which the communication switch is coupled.

7. The communication system of claim 1 where the at least one communication network is the Internet and the user accessible communication portal is an Internet website residing in the registration server and where the user selected feature information relates to one or more requests for automatic and real time transcription of communication signals received by the registration server.

8. The communication system of claim 7 where the one or more requests for transcription of received communication signals is specified for a certain period of time.

9. The communication system of claim 7 where the one or more requests for transcription of received communication signals is specified for a certain number of communication sessions.

10. The communication system of claim 7 where the one or more requests for transcription of received communication signals is specified for a certain number of telephone calls over the Internet.

11. The communication system of claim 7 where the one or more request for transcription of received communication signals is specified for a particular user.

12. The system of claim 7 where the registration server contains received user profile information, user login and password information and user selectable feature information and where said registration server is coupled to a publicly accessible communication network.

\* \* \* \* \*